(12) United States Patent
You et al.

(10) Patent No.: US 9,333,861 B2
(45) Date of Patent: May 10, 2016

(54) METHOD OF CALCULATING POWER CONSUMPTION OF AIR CONDITIONER

(71) Applicant: Hyundai Motor Company, Seoul (KR)

(72) Inventors: Jae Seok You, Seoul (KR); Baro Hyun, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 16 days.

(21) Appl. No.: 14/335,369

(22) Filed: Jul. 18, 2014

(65) Prior Publication Data

US 2015/0170426 A1 Jun. 18, 2015

(30) Foreign Application Priority Data

Dec. 16, 2013 (KR) ........................ 10-2013-0156681

(51) Int. Cl.
| | | |
|---|---|---|
| *B60L 3/00* | (2006.01) | |
| *B60L 1/00* | (2006.01) | |
| *B60L 1/06* | (2006.01) | |
| *B60L 3/12* | (2006.01) | |
| *B60L 11/18* | (2006.01) | |

(52) U.S. Cl.
CPC . *B60L 1/003* (2013.01); *B60L 1/06* (2013.01); *B60L 3/12* (2013.01); *B60L 11/1816* (2013.01); *B60L 11/1861* (2013.01); *B60L 2200/10* (2013.01); *B60L 2200/18* (2013.01); *B60L 2200/32* (2013.01); *B60L 2200/36* (2013.01); *B60L 2240/34* (2013.01); *B60L 2240/80* (2013.01); *B60L 2250/16* (2013.01); *B60L 2260/50* (2013.01); *B60L 2260/52* (2013.01); *B60L 2260/54* (2013.01); *Y02T 10/7005* (2013.01); *Y02T 10/705* (2013.01); *Y02T 10/7044* (2013.01); *Y02T 10/7072* (2013.01); *Y02T 90/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,313,395 A | * | 5/1994 | Kawai | F02D 31/005 123/339.23 |
| 6,532,926 B1 | * | 3/2003 | Kuroda | B60H 1/00778 123/179.4 |
| 7,313,467 B2 | * | 12/2007 | Breed | G07C 5/008 307/9.1 |
| 7,379,800 B2 | * | 5/2008 | Breed | B60C 23/0425 324/200 |
| 2003/0136138 A1 | * | 7/2003 | Tsuboi | B60H 1/0075 62/228.1 |
| 2004/0168454 A1 | * | 9/2004 | Iritani | B60H 1/004 62/230 |
| 2004/0168455 A1 | * | 9/2004 | Nakamura | B60H 1/004 62/244 |
| 2005/0192727 A1 | * | 9/2005 | Shostak | B60C 11/24 701/37 |
| 2005/0234604 A1 | * | 10/2005 | Nakamura | B60R 16/0231 701/2 |
| 2006/0025897 A1 | * | 2/2006 | Shostak | B60C 23/005 701/1 |
| 2006/0185375 A1 | * | 8/2006 | Nadamoto | B60H 1/3208 62/228.1 |
| 2007/0057809 A1 | * | 3/2007 | Su | G08C 17/02 340/12.22 |

(Continued)

*Primary Examiner* — Jonathan L Sample
(74) *Attorney, Agent, or Firm* — Mintz Levin Cohn Ferris Glovsky and Popeo, P.C.; Peter F. Corless (57) ABSTRACT

A method of calculating power consumption of an air conditioner is provided. The method includes calculating, b a controller, a parameter of an autoregressive moving-average (ARMA) model using past initial temperature and target temperature data of an air conditioner as an input variable of the ARMA model, and past accumulated power consumption data of the air conditioner as an output variable of the ARMA model. The controller is configured to set a current target temperature of the air conditioner and detect an indoor temperature of a vehicle, in which the air conditioner is installed. In addition, the controller is configured to substitute the current target temperature, the indoor temperature, and the parameter to the ARMA model, and predict current accumulated power consumption of the air conditioner.

6 Claims, 5 Drawing Sheets

(56) References Cited

U.S. PATENT DOCUMENTS

| | | | | |
|---|---|---|---|---|
| 2007/0068762 A1* | 3/2007 | Bhat | F16D 35/024 | 192/58.61 |
| 2008/0219544 A1* | 9/2008 | Tasaki | H05K 13/08 | 382/141 |
| 2008/0223053 A1* | 9/2008 | Suzuki | B60H 1/3211 | 62/175 |
| 2010/0274407 A1* | 10/2010 | Creed | H02J 3/14 | 700/295 |
| 2010/0326127 A1* | 12/2010 | Oomura | B60H 1/00785 | 62/498 |
| 2011/0231028 A1* | 9/2011 | Ozog | G06Q 10/06 | 700/291 |
| 2013/0036991 A1* | 2/2013 | Kerns | F01P 7/10 | 123/41.04 |
| 2013/0073143 A1* | 3/2013 | Miura | G01C 21/00 | 701/36 |
| 2013/0131892 A1* | 5/2013 | Hashimoto | G01C 21/3469 | 701/1 |
| 2013/0158758 A1* | 6/2013 | Kim | G07C 5/004 | 701/22 |
| 2013/0253740 A1* | 9/2013 | Kim | B60L 1/003 | 701/22 |
| 2013/0311016 A1* | 11/2013 | Kim | B60L 11/1862 | 701/22 |
| 2014/0132214 A1* | 5/2014 | Katanoda | B60L 11/1857 | 320/109 |
| 2014/0238056 A1* | 8/2014 | Kawakami | F25B 31/008 | 62/89 |
| 2014/0358926 A1* | 12/2014 | McGregor | G06F 19/322 | 707/737 |

\* cited by examiner

METHOD OF CALCULATING POWER CONSUMPTION OF AIR CONDITIONER

CROSS-REFERENCE TO RELATED APPLICATION

This application claims priority to and the benefit of Korean Patent Application No. 10-2013-0156681 filed in the Korean Intellectual Property Office on Dec. 16, 2013, the entire contents of which are incorporated herein by reference.

BACKGROUND (a) Field of the Invention

The present invention relates to a method of calculating power consumption of an air conditioner, and more particularly, to a method of calculating power consumption of an air conditioner that calculates power consumed by an air conditioner more accurately.

(b) Description of the Related Art

In general, an electric vehicle receives electric energy from the outside environment, charges a battery with the received electric energy, and then obtains power, which is mechanical energy, with a voltage charged in the battery through a motor coupled to wheels. Accordingly, the electric vehicle should detect a state of a battery, such as a current temperature of the battery and a state of charge (SOC) of the battery, and manage the battery to maintain the state of the battery at a predetermined level or greater.

Accordingly, a battery management system (BMS), which generally manages a state of the battery, prevents shortening the life span according to deterioration of durability of the battery, and notifies a vehicle controller performing a general operation of SOC information about the battery, thereby assisting the vehicle to be traveled while considering the state of the battery. In the electric vehicle using a high voltage battery, an SOC of the battery should be recognized, and further, a technology is needed to recognize a residual capacity of the battery while traveling and to notify a driver of the recognized residual capacity. In this connection, similar to an internal combustion vehicle which predicts a distance to empty (DTE) based on a current fuel state and notifies a driver of the predicted DTE, the electric vehicle provides a function of estimating a DTE (e.g., residual travel distance) based on a current energy state of a battery and displaying the estimated DTE on a cluster, and the like.

As a method of calculating a DTE of an electric vehicle according to the related art, a method of estimating a DTE using a relationship between an SOC (%), which is residual energy of a high voltage battery, and an energy consumption ratio of the vehicle per distance unit has been used. In particular, the amount of energy consumption of a past travel cycle is be reflected to the calculation of the DTE, and in this case, the DTE is calculated by reflecting the total amount of battery consumption. The total amount of battery consumption includes energy consumed by an air conditioner in the past travel cycle, and thus it may not be possible to calculate an accurate DTE except for the portion of the energy consumption of the air conditioner. Accordingly, to more accurately predict the DTE, a method of accurately predicting energy consumption of an air conditioner is required.

The above information disclosed in this section is merely for enhancement of understanding of the background of the invention and therefore it may contain information that does not form the prior art that is already known in this country to a person of ordinary skill in the art.

SUMMARY

The present invention provides a method of calculating power consumption of an air conditioner that may calculate power consumed by an air conditioner more accurately when the air conditioner is operated. Technical objects to be achieved in the present invention are not limited to the mentioned technical objects, and those skilled in the art may clearly understand another non-mentioned technical object from the description of the present invention below.

An exemplary embodiment of the present invention provides a method of calculating power consumption of an air conditioner that may include: calculating a parameter of an autoregressive moving-average (ARMA) model using past initial temperature and target temperature data of an air conditioner as an input variable of the ARMA model, and past accumulated power consumption data of the air conditioner as an output variable of the ARMA model; setting a current target temperature of the air conditioner; detecting an indoor temperature of a vehicle, in which the air conditioner is installed; and substituting the current target temperature, the indoor temperature, and the parameter to the ARMA model, and predicting current accumulated power consumption of the air conditioner.

An effect of the method of calculating power consumption of an air conditioner according to the present invention will be described below. According to at least one of the exemplary embodiments of the present invention, it may be possible to more accurately calculate a DTE of an electric vehicle by accurately predicting power consumption of an air conditioner. The effects, which may be achieved in the present invention, are not limited to the aforementioned effects, and those skilled in the art may clearly understand other non-mentioned effects from the description of the present invention below.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the following detailed description, exemplary embodiments of the present invention have been shown and described, simply by way of illustration. As those skilled in the art would realize, the described exemplary embodiments may be modified in various different ways, all without departing from the spirit or scope of the present invention. Throughout the specification, unless explicitly described to the contrary, the word "comprise" and variations such as "comprises" or "comprising," will be understood to imply the inclusion of stated elements but not the exclusion of any other elements.

An exemplary embodiment of the present invention will hereinafter be described in detail with reference to the accompanying drawings.

Figure 1:
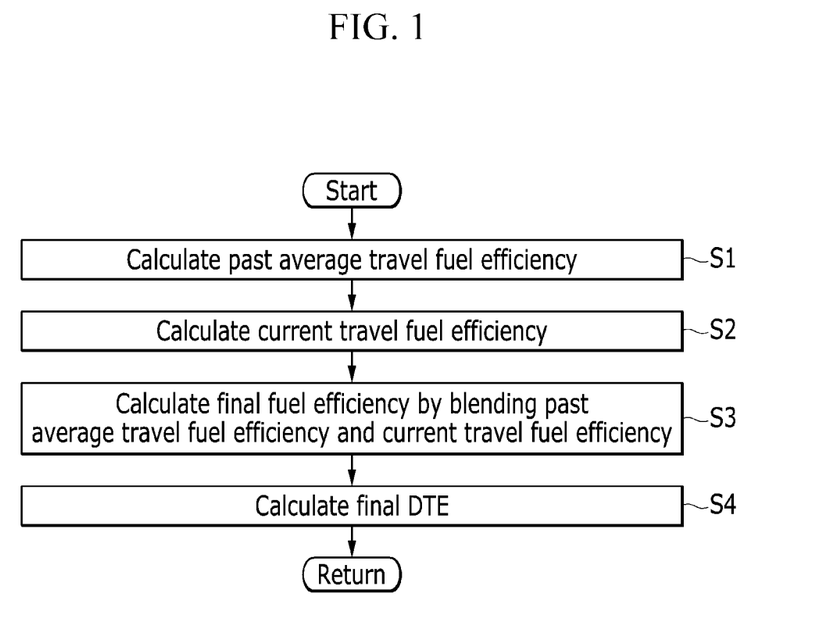
FIG. 1 is an exemplary flowchart illustrating a method of calculating a DTE according to an exemplary embodiment of the present invention.

FIG. 1 is an exemplary flowchart illustrating a method of calculating a distance to empty (DTE) according to an exemplary embodiment of the present invention. As illustrated in FIG. 1, a method of calculating a DTE may include calculating, by a controller, past average travel fuel efficiency (S1), calculating, by the controller, current travel fuel efficiency (S2), calculating, by the controller, final fuel efficiency by combining the past average travel fuel efficiency and the current travel fuel efficiency (S3), and calculating, by the controller, a DTE from the calculated final fuel efficiency (S4).

In the present invention, a main agent of the calculation process may be a controller that includes a calculation block for performing a calculation in each process, and a storage means, and in this case, the finally calculated DTE may be displayed on a cluster. Accordingly, the controller may be a trip computer of a vehicle, or a separate controller configured to calculate a DTE and transmit the calculated DTE to a trip computer. Further, the controller may be configured to use SOC information regarding a battery and receive the SOC information regarding the battery from a battery management system. Additionally, the controller may be configured to receive an on/off signal and information regarding an operation state of an air conditioner from an air conditioner controller. In particular, the past average travel fuel efficiency may be calculated by averaging fuel efficiency of a past travel cycle (e.g., a time from a previous charging time to a next charging time is defined as one travel cycle), to calculate the past average travel fuel efficiency by calculating fuel efficiency (km/%) for an end of each travel cycle (e.g., an end of a previous travel cycle during charging), storing the calculated fuel efficiency, and then averaging the stored fuel efficiency of the cycles.

Fuel efficiency (km/%) of a travel cycle may be calculated by "accumulated travel distance (km) of corresponding travel cycle/$\Delta$SOC(%)." In particular, $\Delta$SOC(%) may be a value of a difference between an SOC (%) after previous charging and an SOC (%) before current charging. Further, when the final fuel efficiency is calculated, the DTE may be calculated based on the calculated final fuel efficiency, and may be displayed on the cluster, and the like, and in this case, the DTE (km) may be calculated by "final fuel efficiency (km/%)×current SOC (%)."

The SOC of the battery may be required during the calculation of the DTE of an electric vehicle, and particularly, when the fuel efficiency of the current travel cycle is calculated, the total amount of battery consumption (e.g., corresponding to $\Delta$SOC) during the cycle may be reflected. Particularly, the amount of energy consumption of the current travel cycle may be reflected to the calculation of the DTE, and in this case, the DTE may be calculated by reflecting the total amount of battery consumption. The total amount of battery consumption may include energy consumed by the air conditioner in the current travel cycle, and thus it may be necessary to calculate a more accurate DTE except for the portion of the energy consumption of the air conditioner. Energy consumed by the air conditioner, which is power consumed by the air conditioner when a driver operates the air conditioner, may be power consumed by a cooling device (e.g., an air conditioner compressor, and the like) and a heating device (e.g., an electric heater, and a positive temperature coefficient (PTC) heater). Accordingly, the present invention may more accurately predict power consumed by the air conditioner using an autoregressive moving-average (ARMA) model.

Figure 2:
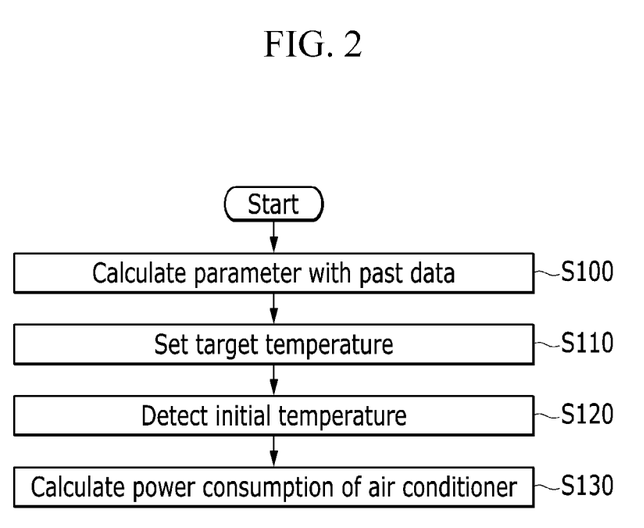
FIG. 2 is an exemplary flowchart illustrating a method of predicting power consumption of an air conditioner according to the exemplary embodiment of the present invention.

A method of accurately calculating power consumed according to driving of the air conditioner using the ARMA model will be described with reference to FIG. 2 below. FIG. 2 is an exemplary flowchart illustrating a method of predicting power consumption of the air conditioner according to the exemplary embodiment of the present invention. First, the controller may be configured to calculate a parameter of the ARMA model with past data (S100). The past data may include data of an initial temperature within the vehicle, data of a target temperature set by a user, and data of accumulated power consumption consumed according to driving of the air conditioner, during the past driving of the air conditioner. The controller may be configured to use the initial temperature and the target temperature of the past data as an input variable of the ARMA model, and the accumulated power consumption of the past data as an output variable thereof.

Figure 3:
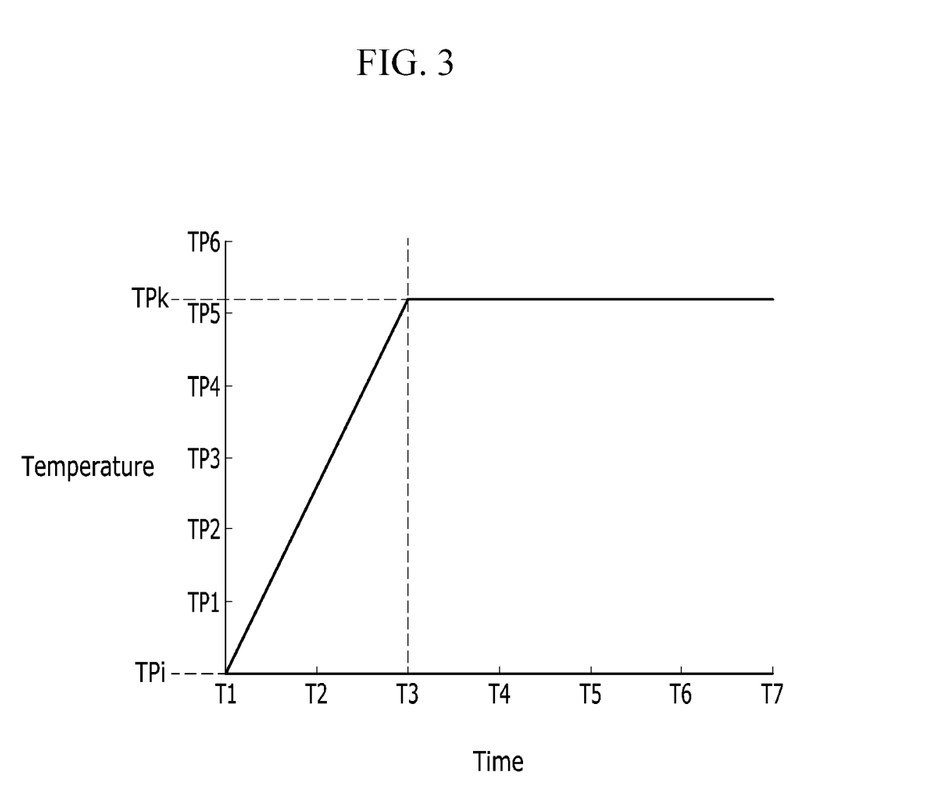
FIG. 3 is an exemplary graph illustrating an initial temperature and a target temperature according to a time of past data used in the method of predicting power consumption of the air conditioner according to the exemplary embodiment of the present invention.
Figure 4:
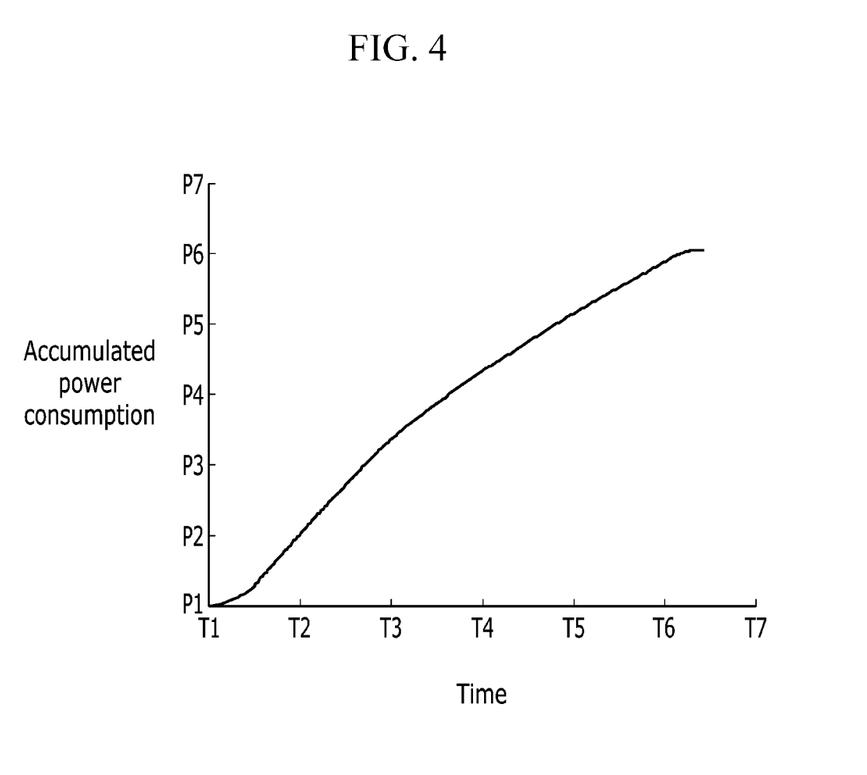
FIG. 4 is an exemplary graph illustrating accumulated power consumption according to a time of past data used in the method of predicting power consumption of the air conditioner according to the exemplary embodiment of the present invention.

In particular, the past data will be described with reference to FIGS. 3 and 4. FIG. 3 is an exemplary graph illustrating an initial temperature and a target temperature according to a time of past data used in the method of predicting power consumption of the air conditioner according to the exemplary embodiment of the present invention, and FIG. 4 is an exemplary graph illustrating accumulated power consumption according to a time of past data used in the method of predicting power consumption of the air conditioner according to the exemplary embodiment of the present invention.

As illustrated in FIG. 3, a temperature within the vehicle may be changed from an initial temperature TPi to a target temperature TPk based on a time by driving of the air conditioner. In particular, a temperature within the vehicle at time T3 may reach the target temperature TPk. The graph of FIG. 3 may be expressed by Equation 1 below.

$$x = \frac{TPk - TPi}{T3}t + TPi \quad (0 < t \leq T3) \quad \text{Equation 1}$$
$$x = TPk \quad (T3 < t)$$

wherein, x may indicate a temperature, t may indicate a time, TPi may indicate an initial temperature, and TPk may indicate a target temperature.

Further, FIG. 4 illustrates a value of accumulated power consumed by the air conditioner based on a time when the air conditioner is driven. The value of the power consumed by the air conditioner may be sharply changed (e.g., significantly changed) based on a time, and the accumulated power consumption of the air conditioner may be used as an output variable of the ARMA model. The ARMA model designed using an input variable and an output variable may be expressed by Equation 2 below.

$$yk = a1y_{k-1} + a2y_{k-2} + a3y_{k-3} + b1x_{k-1} + b2x_{k-2} + b3x_{k-3} \quad \text{Equation 2}$$

wherein, k-1 indicates a first delay, k-2 indicates a second delay, and k-3 indicates a third delay. In particular, a1, a2, a3, b1, b2, and b3 may be parameters of the ARMA model. Equation 2 may be the ARMA model using up to the third delay of the input variable and the output variable. However, the number of delays of the input variable and the output variable used by the ARMA model is not limited thereto.

When Equation 2 is represented in the vector form to calculate the parameter of the ARMA model, Equation 3 below is obtained.

$$yk = Ap \quad \text{Equation 3}$$

where $$A = [\, y_{k-1} \quad y_{k-2} \quad y_{k-3} \quad x_{k-1} \quad x_{k-2} \quad x_{k-3} \,],$$

-continued $$p = \begin{bmatrix} a1 \\ a2 \\ a3 \\ b1 \\ b2 \\ b3 \end{bmatrix}$$

To calculate a p-matrix, which is a parameter matrix, Equation 3 may be calculated by Equation 4.

$$p = (A^T A)^{-1} A yk \quad \text{Equation 4}$$

Then, the controller may design the ARMA model using the past data as the input/output variable. Further, the controller may be configured to set a target temperature by a manipulation of a user and the like (S110). The controller may be configured to detect (e.g., sense) an initial temperature within the vehicle (S120) and calculate accumulated power consumption of the air conditioner based on a time with the parameter matrix using the set target temperature and the initial temperature as the input variables (S130).

Figure 5:
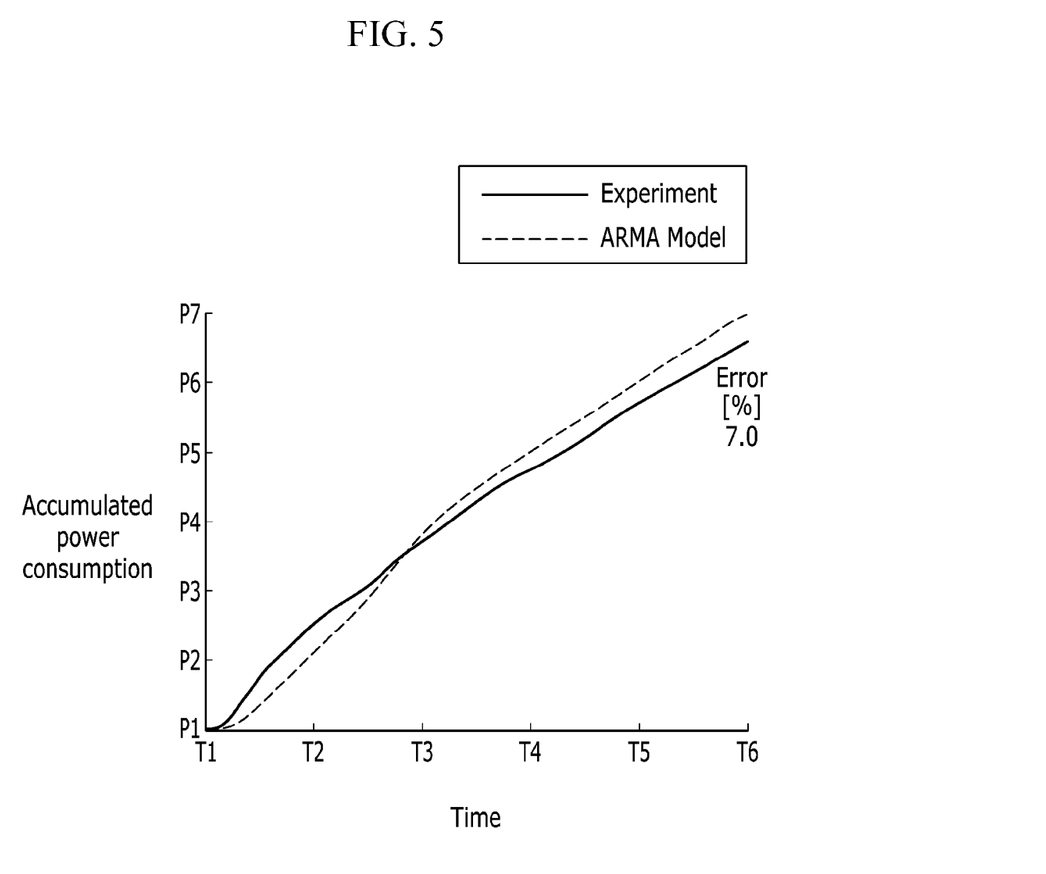
FIG. 5 is an exemplary graph illustrating accumulated power consumption according to a time predicted according to the method of predicting power consumption of the air conditioner according to the exemplary embodiment of the present invention, and actually measured accumulated power consumption according to a time.

In particular, an error between the accumulated power consumption calculated by the controller and actual accumulated power consumption will be described with reference to FIG. 5. FIG. 5 is an exemplary graph illustrating accumulated power consumption based on a time predicted according to the method of predicting power consumption of the air conditioner according to the exemplary embodiment of the present invention, and actually measured accumulated power consumption according to a time. As illustrated in FIG. 5, an error between accumulated power consumption measured by an experiment indicated by a solid line in the graph and the accumulated power consumption calculated by the controller indicated by a dotted line is 7%. Accordingly, it may be possible to more accurately predict a DTE of a vehicle using power consumption of an air conditioner calculated by the method of calculating power consumption of the air conditioner by using the ARMA model.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:

1. A method of calculating power consumption of an air conditioner, comprising:
    calculating, by a controller, a parameter of an autoregressive moving-average (ARMA) model using past initial temperature and target temperature data of an air conditioner as an input variable of the ARMA model, and past accumulated power consumption data of the air conditioner as an output variable of the ARMA model;
    setting, by the controller, a current target temperature of the air conditioner;
    detecting, by the controller, an indoor temperature of a vehicle, in which the air conditioner is installed; and
    substituting, by the controller, the current target temperature, the indoor temperature, and the parameter to the ARMA model, and predicting current accumulated power consumption of the air conditioner.

2. A method of calculating a distance to empty of a vehicle, comprising:

calculating, by a controller, a past average travel fuel efficiency;
calculating, by the controller, a current travel fuel efficiency;
combining, by the controller, the past average travel fuel efficiency and the current travel fuel efficiency;
calculating, by the controller, a fuel efficiency that corresponds to power consumption of an air conditioner;
calculating, by the controller, a final fuel efficiency by reflecting fuel efficiency that corresponds to the power consumption of the air conditioner to travel fuel efficiency obtained through the combination process; and
calculating, by the controller, a distance to empty (DTE) based on the final fuel efficiency,
wherein the power consumption of the air conditioner is calculated by a method comprising:
calculating, by a controller, a parameter of an autoregressive moving-average (ARMA) model using past initial temperature and target temperature data of an air conditioner as an input variable of the ARMA model, and past accumulated power consumption data of the air conditioner as an output variable of the ARMA model;
setting, by the controller, a current target temperature of the air conditioner;
detecting, by the controller, an indoor temperature of a vehicle, in which the air conditioner is installed; and
substituting, by the controller, the current target temperature, the indoor temperature, and the parameter to the ARMA model, and predicting current accumulated power consumption of the air conditioner.

3. A system for calculating power consumption of an air conditioner, comprising:
a memory configured to store program instructions; and
a processor configured to execute the program instructions, the program instructions when executed configured to:
calculate a parameter of an autoregressive moving-average (ARMA) model using past initial temperature and target temperature data of an air conditioner as an input variable of the ARMA model, and past accumulated power consumption data of the air conditioner as an output variable of the ARMA model;
set a current target temperature of the air conditioner;
detect an indoor temperature of a vehicle, in which the air conditioner is installed; and
substitute the current target temperature, the indoor temperature, and the parameter to the ARMA model, and predicting current accumulated power consumption of the air conditioner.

4. A system for calculating a distance to empty of a vehicle, comprising:
a memory configured to store program instructions; and
a processor configured to execute the program instructions, the program instructions when executed configured to:
calculate a past average travel fuel efficiency;
calculate a current travel fuel efficiency;
combine the past average travel fuel efficiency and the current travel fuel efficiency;
calculate a fuel efficiency that corresponds to power consumption of an air conditioner;
calculate a final fuel efficiency by reflecting fuel efficiency that corresponds to the power consumption of the air conditioner to travel fuel efficiency obtained through the combination process; and
calculate a distance to empty (DTE) based on the final fuel efficiency,
wherein the program instructions, when executed to calculate the power consumption of the air conditioner, are configured to:
calculate a parameter of an autoregressive moving-average (ARMA) model using past initial temperature and target temperature data of an air conditioner as an input variable of the ARMA model, and past accumulated power consumption data of the air conditioner as an output variable of the ARMA model;
set a current target temperature of the air conditioner;
detect an indoor temperature of a vehicle, in which the air conditioner is installed; and
substitute the current target temperature, the indoor temperature, and the parameter to the ARMA model, and predicting current accumulated power consumption of the air conditioner.

5. A non-transitory computer readable medium containing program instructions executed by a controller, the computer readable medium comprising:
program instructions that calculate a parameter of an autoregressive moving-average (ARMA) model using past initial temperature and target temperature data of an air conditioner as an input variable of the ARMA model, and past accumulated power consumption data of the air conditioner as an output variable of the ARMA model;
program instructions that set a current target temperature of the air conditioner;
program instructions that detect an indoor temperature of a vehicle, in which the air conditioner is installed; and
program instructions that substitute the current target temperature, the indoor temperature, and the parameter to the ARMA model, and predicting current accumulated power consumption of the air conditioner.

6. The non-transitory computer readable medium of claim 5, further comprising:
program instructions that calculate a past average travel fuel efficiency;
program instructions that calculate a current travel fuel efficiency;
program instructions that combine the past average travel fuel efficiency and the current travel fuel efficiency;
program instructions that calculate a fuel efficiency that corresponds to the current accumulated power consumption of the air conditioner;
program instructions that calculate a final fuel efficiency by reflecting fuel efficiency that corresponds to the current accumulated power consumption of the air conditioner to travel fuel efficiency obtained through the combination process; and
program instructions that calculate a distance to empty (DTE) based on the final fuel efficiency.

* * * * *